(12) United States Patent
Boder et al.

(10) Patent No.: US 7,957,842 B2
(45) Date of Patent: Jun. 7, 2011

(54) APPARATUS AND METHOD FOR CONTROLLING AN AIR SUPPLY FOR DRYING PAINTED VEHICLES AND OTHER OBJECTS

(75) Inventors: Howard M. Boder, Guildford (GB); Sam Altschuler, Cambridge (GB)

(73) Assignee: Honeywell International Inc., Morristown, NJ (US)

( * ) Notice: Subject to any disclaimer, the term of this patent is extended or adjusted under 35 U.S.C. 154(b) by 404 days.

(21) Appl. No.: 12/033,134

(22) Filed: Feb. 19, 2008

(65) Prior Publication Data

US 2009/0210094 A1 Aug. 20, 2009

(51) Int. Cl.
G05D 11/00 (2006.01)
G05B 13/02 (2006.01)
F26B 13/10 (2006.01)
F26B 21/06 (2006.01)

(52) U.S. Cl. .............. 700/283; 700/29; 700/36; 700/38; 700/282; 34/524; 34/539

(58) Field of Classification Search .............. 700/29–31, 700/36, 38, 51, 208, 274, 276–278, 282–283; 703/9; 34/524, 535, 539, 546, 552; 165/200, 165/228, 229, 230, 244
See application file for complete search history.

(56) References Cited

U.S. PATENT DOCUMENTS

| | | | |
|---|---|---|---|
| 5,408,838 A | 4/1995 | Yaeger et al. | |
| 5,984,002 A * | 11/1999 | Kido et al. | 165/228 |
| 6,792,331 B1 * | 9/2004 | Hamstrom et al. | 700/208 |
| 2005/0267639 A1 * | 12/2005 | Sharma et al. | 700/276 |
| 2008/0311836 A1 | 12/2008 | Bhattacharya | |

OTHER PUBLICATIONS

Paul S. Fountain, "Apparatus and Method for Optimizing a Liquefied Natural Gas Facility", U.S. Appl. No. 11/708,957, filed Feb. 21, 2007.
Howard M. Boder, "Apparatus and Method for Optimizing Operation of Sugar Dryers", U.S. Appl. No. 12/029,587, filed Feb. 12, 2008.
H. Van Dyke Parunak, "Practical and Industrial Applications of Agent-Based Systems", 1998, 41 pages, see esp. p. 18.
"Direct-Fired Heating & Ventilating", The AA Series, AbsolutAire, Dec. 2004, 16 pages, see esp. p. 12-13.
Lichtenteld, Rachel "Paint Booth Project Conserves Energy, Reduces Costs", College of Engineering, Nov. 2, 2007, vol. 79, The Ohio State University, pp. 1-2, http://engineering.osu.edu/nie/article.
Operational Domains FY2008 Initiatives, Honda Environmental Annual Report 2008, pp. 1-4, http://world.honda.com/environment/ecology/2008report/overseas/overseas11/, Apr. 22, 2009.

* cited by examiner

Primary Examiner — Sean P Shechtman
(74) Attorney, Agent, or Firm — Munck Carter, LLP (57) ABSTRACT

A method includes determining how to adjust one or more manipulated variables using at least one model. The one or more manipulated variables are associated with a supply of conditioned air for drying one or more objects. The method also includes generating one or more control signals to control one or more controlled variables associated with the supply of conditioned air. The one or more controlled variables include temperature, dewpoint, and/or humidity of the conditioned air. The one or more manipulated variables include a flow of heated material (like steam) used to condition the conditioned air. The one or more manipulated variables could also include a number of active units in a humidifier. Generating the one or more control signals could include accumulating adjustments associated with the humidifier and generating a control signal to alter the number of active units in the humidifier when the accumulated adjustments exceed a threshold.

20 Claims, 6 Drawing Sheets

APPARATUS AND METHOD FOR CONTROLLING AN AIR SUPPLY FOR DRYING PAINTED VEHICLES AND OTHER OBJECTS

TECHNICAL FIELD

This disclosure relates generally to control systems and more specifically to an apparatus and method for controlling an air supply for drying painted vehicles and other objects.

BACKGROUND

Automobiles and other vehicles are routinely painted during production. Often times, these paints have specific drying requirements, such as ranges of acceptable temperature and humidity at which the paints should be dried. Failure to dry the paints within these temperature and humidity ranges often leads to improper drying of the paints. Among other things, this can result in incorrect or undesired finishes to the paints, which could require repainting.

Air supply houses are often used to provide air at acceptable temperature and humidity for drying the paints on vehicles. The air supply houses typically condition air from the surrounding environment so that the air has desired characteristics. The conditioned air is then used to dry the paints on the vehicles.

Control of these air supply houses is often difficult due to several factors. These factors can include the number of process variables that affect the operation of the air supply houses, ever-changing ambient conditions, and shifts in active process constraints. As a result, air supply houses are often run at sub-optimal operation. Among other things, this typically causes excessive energy usage, excessive wear and tear on components of the air supply houses, and monetary losses.

SUMMARY

This disclosure provides an apparatus and method for controlling an air supply for drying painted vehicles and other objects.

In a first embodiment, an apparatus includes at least one memory configured to store at least one model. The at least one model is associated with one or more manipulated variables and one or more controlled variables. The one or more manipulated variables and the one or more controlled variables are associated with a supply of conditioned air for drying one or more objects. The apparatus also includes at least one processor configured to determine how to adjust the one or more manipulated variables using the at least one model. The one or more controlled variables include a temperature, a dewpoint, and/or a humidity of the conditioned air. The one or more manipulated variables include a flow of heated material used to condition the conditioned air.

In particular embodiments, the one or more controlled variables include an average temperature of pre-heated air that is conditioned to produce the conditioned air, the humidity of the conditioned air, and the temperature of the conditioned air.

In other particular embodiments, the one or more manipulated variables include a flow of fuel to a burner used to pre-heat air that is conditioned to produce the conditioned air, a flow of steam to a steam sprayer, a flow of steam to a heater, and a flow of chilled water to a cooler.

In yet other particular embodiments, the one or more manipulated variables include a number of active units in a humidifier. Also, the at least one processor may be further configured to accumulate adjustments associated with the humidifier and to alter the number of active units in the humidifier when the accumulated adjustments exceed a threshold.

In still other particular embodiments, the at least one model is further associated with one or more disturbance variables. The one or more disturbance variables include a temperature and/or a dewpoint associated with incoming air that is conditioned to produce the conditioned air.

In additional particular embodiments, generation of the conditioned air includes use of steam. Also, the at least one processor is configured to determine how to adjust the one or more manipulated variables so that the use of steam is minimized. The generation of the conditioned air could also include use of fuel for a burner, and the at least one processor could be configured so that minimizing the use of steam has a higher priority than minimizing the use of fuel.

In a second embodiment, a method includes determining how to adjust one or more manipulated variables using at least one model. The one or more manipulated variables are associated with a supply of conditioned air for drying one or more objects. The method also includes generating one or more control signals to control one or more controlled variables associated with the supply of conditioned air. The one or more controlled variables include a temperature, a dewpoint, and/or a humidity of the conditioned air. The one or more manipulated variables include a flow of heated material used to condition the conditioned air.

In a third embodiment, a computer program is embodied on a computer readable medium. The computer program includes computer readable program code for determining how to adjust one or more manipulated variables using at least one model. The one or more manipulated variables are associated with a supply of conditioned air for drying one or more objects. The computer program also includes computer readable program code for generating one or more control signals to control one or more controlled variables associated with the supply of conditioned air. The one or more controlled variables include a temperature, a dewpoint, and/or a humidity of the conditioned air. The one or more manipulated variables include a flow of heated material used to condition the conditioned air.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 7, discussed below, and the various embodiments used to scribe the principles of the present invention in this patent document are by way of illustration only and should not be construed in any way to limit the scope of the invention. Those skilled in the art will understand that the principles of the invention may be implemented in any type of suitably arranged device or system.

Figure 1:
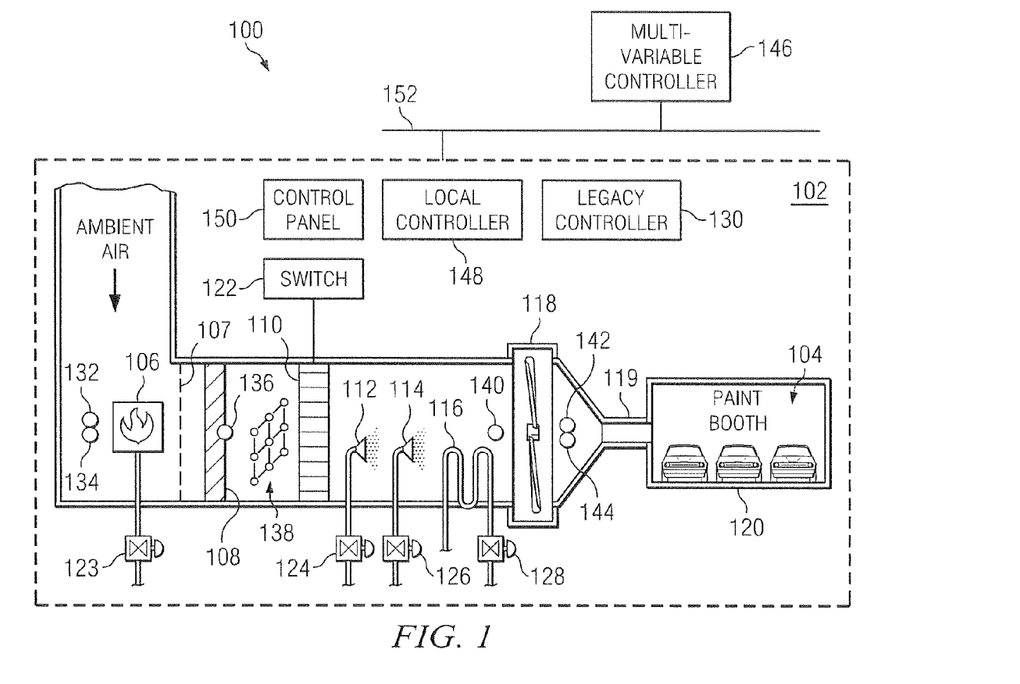
FIG. 1 illustrates an example system for drying painted vehicles or other objects according to this disclosure.

FIG. 1 illustrates an example system 100 for drying painted vehicles or other objects according to this disclosure. The embodiment of the system 100 shown in FIG. 1 is for illustration only. Other embodiments of the system 100 could be used without departing from the scope of this disclosure.

Initially, it may be noted that the following description routinely describes the use of the system 100 for drying paints on painted vehicles. However, the system 100 or its associated control mechanisms could be used in various other environments. For example, the system 100 or its control mechanisms could be used to dry paints on other types of painted objects. In general, the system 100 or its control mechanisms could be used to dry any suitable material(s) placed on any suitable object(s).

In this example embodiment, the system 100 includes equipment for providing air having one or more desired characteristics, such as air having a temperature within a specified temperature range and a humidity within a specified humidity range. The air is used to dry paints on one or more painted vehicles. The specified temperature and humidity ranges typically vary based on the paints applied to the vehicles. The proper temperature and humidity ranges are often required in order for the paints to dry properly, such as in order for the dried paints to have a proper or desired finish.

Conditioning air so that it has an appropriate temperature and humidity is often a constantly-changing task. Depending on the ambient environment, air sometimes needs to be cooled and sometimes needs to be heated. The air may need additional humidity at some times, while the humidity may need to be reduced at other times. The equipment shown in FIG. 1 represents one possible implementation of a system 100 for controlling air used to dry painted vehicles or other objects. Other types of systems having other or additional equipment or having equipment in a different configuration could also be used.

In this example, the system 100 includes one or more air supply houses 102. Each air supply house 102 generally includes equipment and facilities for drying one or multiple painted objects 104. In this example, the painted objects 104 represent cars or other vehicles, but any other suitable objects could be dried using the equipment and facilities shown in FIG. 1.

As shown in FIG. 1, each air supply house 102 receives a supply of air, which typically represents air from the ambient environment. The air is provided to a burner 106, which pre-heats the air. The burner 106 typically represents a structure that heats air through combustion of a fuel, such as natural gas. However, the burner 106 may represent any suitable structure for heating air using any suitable mechanism, including combustion of natural gas or other fuel.

The pre-heated air moves through a perforated screen 107 and through an air filter 108, which help to filter the pre-heated air. The screen 107 and filter 108 could, for example, remove particulate matter such as soot from the air. The screen 107 and air filter 108 could remove any other or additional components from the air. The perforated screen 107 represents any suitable perforated material, such as a perforated metal screen. The filter 108 represents any suitable structure for filtering air, such as a bag filter.

The filtered air is provided to a humidifier 110, which humidifies the air. The humidifier 110 could, for example, operate to cause the pre-heated air to have a humidity that is 80-90% of the incoming air's initial dewpoint. The humidifier 110 represents any suitable structure for adding humidity to air. As a particular example, the humidifier 110 could include a "biscuit," which typically represents a structure that has a relatively large surface area within a relatively small space. The biscuit could, for instance, resemble a piece of coarse steel wool. Water is typically sprayed on the biscuit, and the pre-heated air is passed through the biscuit. This causes the sprayed water to evaporate, increasing the humidity of the pre-heated air. Note that this is one example embodiment of the humidifier 110 and that any other suitable mechanisms could be used to humidify air. In particular embodiments, multiple units could form the humidifier 110 (such as six biscuits), although other types of humidifiers could be used.

Characteristics of the air leaving the humidifier 110 can be adjusted further using a cooler 112, a steam sprayer 114, and a heater 116. The cooler 112 decreases the temperature of the air. For example, the cooler 112 could receive a flow of chilled water, air, or other material and spray the material into the air being conditioned. In other embodiments, the cooler 112 could represent a coil or other structure that receives chilled water or other material for cooling the air (without spraying the material). The cooler 112 includes any suitable structure for cooling air.

The steam sprayer 114 receives a flow of steam and sprays the steam into the air being conditioned. This can be done to further increase the humidity or temperature of the air being conditioned. The steam sprayer 114 includes any suitable structure for injecting steam into air. The heater 116 receives a flow of steam or other heated material, and heat from the material is used to heat the air being conditioned. This can be done to increase the temperature of the air being conditioned. The heater 116 includes any suitable structure for heating air.

It may be noted that any number and arrangement of coolers 112, steam sprayers 114, and heaters 116 could be used in the air supply house 102. Also, the advanced control of the air supply house 102 described below may be applied irrespective of the configuration of these components.

A fan unit 118 provides the conditioned air to a fast header 119 of a paint booth 120. The fan unit 118 can also pull air into the air supply house 102, allowing the air to be heated by the burner 106 and further conditioned. The fan unit 118 includes any suitable structure for moving air, such as one or more fixed-speed supply fans. The fast header 119 represents any suitable structure for providing air from a fan unit to a paint booth. The paint booth 120 represents any suitable structure for receiving the conditioned air and for holding one or more vehicles or other objects 104 to be dried.

In FIG. 1, various components are used to control the operation of the air supply house 102. For example, the humidifier 110 could include multiple units, and a multi-position switch 122 could be used to control the number of units that are active at any given time. The multi-position switch 122 represents any suitable structure for controlling the number of humidifier units that are operating to add humidity to air. The air supply house 102 also includes a valve 123, which controls the flow of fuel (such as natural gas) to the burner 106. The air supply house 102 further includes valves 124, 126, and 128, which control the flow of material to the cooler 112, steam sprayer 114, and heater 116, respectively. Each of the valves 123-128 represents any suitable structure for controlling the flow of material.

In addition, the air supply house 102 could include one or more legacy controllers 130. The legacy controllers 130 may represent controllers used to control the various components of the air supply house 102, such as the valves 123-128. The legacy controllers 130 may, for example, represent conventional proportional-integral-derivative (PID) controllers, which are common in industrial settings. In particular embodiments, the legacy controllers 130 may be present in air supply houses that are being retrofitted with more advanced control functionality (which is described below). Of course, no legacy controllers 130 could be present in the system 100, or any existing legacy controllers 130 could be removed from the system 100.

Various sensors are also provided in the air supply house 102. For example, a temperature sensor 132 and a dewpoint sensor 134 measure the temperature and dewpoint of the incoming air (prior to conditioning). These measurements could be used to help adjust the operation of the air supply house 102 to changing ambient conditions. A temperature sensor 136 measures the temperature of the air at the filter 108 and can be used for over-temperature protection. An array of temperature sensors 138 is positioned after the filter 108 and can be used to identify an average temperature of the filtered air. A temperature sensor 140 measures the temperature of the air around or after the heater 116 and can be used for over-temperature protection. A temperature sensor 142 and a dewpoint sensor 144 measure the temperature and dewpoint of the conditioned air entering the paint booth 120. These measurements could be used to identify the temperature and humidity of the air entering the paint booth 120. Each of the temperature sensors could represent any suitable device for measuring temperature, such as a resistive temperature detector (RTD) or thermocouple. Each of the dewpoint sensors could represent any suitable device for measuring dewpoint, such as a hygrothermometer.

Various factors can affect and alter the operation of the air supply house 102. For example, since the air being conditioned is drawn from the ambient environment, the characteristics of the air typically vary over time. As particular examples, the temperature, humidity, and pressure of the air often vary as the weather changes or as the seasons change. Also, the fuel provided to the burner 106 (such as natural gas) can often vary in its calorific value, meaning the amount of heat generated by burning the fuel varies. Further, the perforated screen 107 and the air filter 108 can become clogged, or surfaces in the air supply house 102 can become fouled. In addition, changes that occur as a result of system start-ups and shutdowns are common.

To facilitate more accurate control over the air supply house(s) 102, a multi-variable controller 146 is provided in the system 100. The multi-variable controller 146 may, for example, make automatic process adjustments to control and optimize the operation of the air supply houses 102. In general, an air supply house 102 is associated with "process variables," which represent various aspects of the air supply house 102. The controller 146 may operate by attempting to maintain a "controlled variable" (CV) at or near a desired value or within a desired operating range. The controller 146 attempts to maintain the controlled variable by altering one or more "manipulated variables" (MVs), such as an opening of a valve. A "disturbance variable" (DV) represents a process variable that affects a controlled variable, where the disturbance variable can be considered by the controller 146 but generally cannot be controlled by the controller 146 (such as ambient temperature or humidity). By controlling certain controlled variables, the controller 146 may optimize the process performed by an air supply house 102.

The controller 146 may use one or more mathematical models of the process being controlled. The models relate independent variables (manipulated and disturbance variables) to dependent variables (controlled variables). The models can be developed during the design of the controller 146, such as by using step-test data. The models are then used by the controller 146 to control an air supply house 102 when the controller 146 goes on-line or is activated. For example, the controller 146 may use the models to predict the future values of the controlled variables and to calculate and implement adjustments to the manipulated variables to maintain the controlled variables within their defined limits. As particular examples, the controller 146 may use the models to keep the conditioned air provided to the paint booth 120 within acceptable temperature and humidity ranges. At the same time, the controller 146 can reduce the expenses associated with operation of the air supply house 102.

The proper selection of controlled, manipulated, and disturbance variables may be important or critical to the performance of the controller 146. Examples of these types of variables are provided below. The controller 146 could also operate at any suitable frequency in the system 100. For example, the controller 146 could operate at a 30-second interval. During each interval, the controller 146 can be used to make automatic process adjustments to control and optimize the air supply house 102.

The use of the multi-variable controller 146 can provide various benefits in the system 100 depending on the implementation. For example, the controller 146 may allow controlled variables to be controlled closer to their constraints, allowing the air supply houses 102 to operate in an improved or optimum manner. Also, better control can cause less utility or energy consumption, resulting in cost savings. Further, more accurate control can result in more consistent qualities in the dried objects 104, such as more consistent finishes to painted vehicles. In addition, use of the controller 146 could result in less equipment maintenance and its associated costs.

As a particular example of these benefits, prior controllers often attempted to condition incoming air when the air's characteristics were not at exact values (such as exact temperature and humidity values). This resulted in energy usage even if the incoming air's characteristics were within acceptable temperature and humidity ranges. By allowing the multi-variable controller 146 to optimize the controlled variables within acceptable ranges, less energy is required, which could result in significant cost savings.

Figure 2:
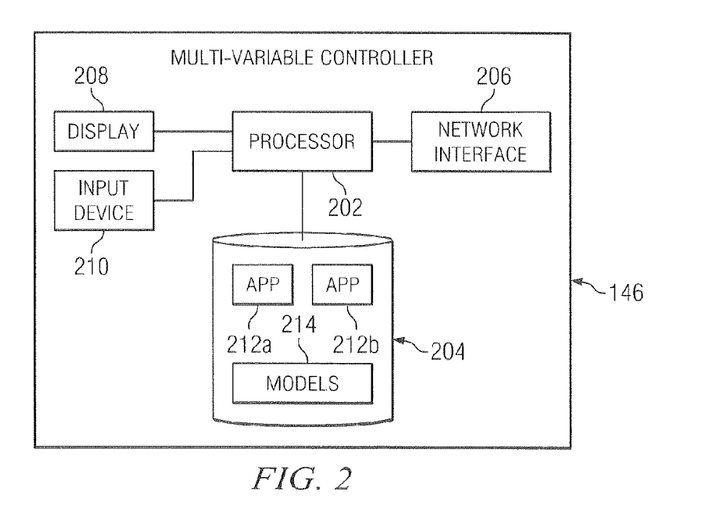
FIG. 2 illustrates an example multi-variable controller for optimizing operation of an air supply house according to this disclosure.

The controller 146 includes any hardware, software, firmware, or combination thereof for controlling one or more air supply houses. The controller 146 could, for example, include one or more processors and one or more memories storing data and instructions (such as models of the air supply houses 102) used, generated, or collected by the processor(s). As a particular example, the controller 146 could represent a controller implemented using PROFIT CONTROLLER from HONEYWELL INTERNATIONAL INC. (previously known as Robust Multivariable Predictive Control Technology or "RMPCT"). In this embodiment, the controller 146 could include an EXPERION OPC server, an EXPERION server pair, and an EXPERION EAS server from HONEYWELL INTERNATIONAL INC. Another example embodiment of the controller 146 is shown in FIG. 2, which is described below.

Depending on the implementation, the multi-variable controller 146 could be configured to directly control components in the air supply houses 102. The multi-variable controller 146 could also be configured to control the components in the air supply houses 102 indirectly through the legacy controllers 130 or through one or more local controllers 148. A legacy controller 130 or a local controller 148 could receive data from the multi-variable controller 146 defining how the air supply house 102 should be controlled and then implement that control. The local controller 148 could include any hardware, software, firmware, or combination thereof for controlling an air supply house or portion thereof. The local controller 148 could, for example, represent an HC900 controller from HONEYWELL INTERNATIONAL INC.

One or more control panels 150 could also be provided in the air supply house 102. The control panel 150 could facilitate user interaction with the local controller 148 or the multi-variable controller 146. As particular examples, the control panel 150 could display process information to a user, receive user input (such as commands for starting and stopping controlled operations), or receive or present alarm data. The control panel 150 could be used in any other or additional manner. Each control panel 150 includes any suitable input-output device for interacting with one or more users.

A network 152 couples the controller 146 to one or more air supply houses 102. The network 152 facilitates communication between various components in the system 100. For example, the network 152 could transport measurement data from the sensors to the controller 146 and provide control signals from the controller 146 to the air supply house 102. The network 152 could represent any suitable network or combination of networks. As particular examples, the network 152 could represent an Ethernet network, an electrical signal network (such as a HART or FOUNDATION FIELDBUS network), a pneumatic control signal network, or any other or additional type(s) of network(s).

Although FIG. 1 illustrates one example of a system 100 for drying painted vehicles or other objects, various changes may be made to FIG. 1. For example, the system could include any number of controllers and air supply houses, including a single air supply house. Also, each air supply house could include any suitable components in any suitable configuration. In addition, various ones of the controllers (such as controllers 130 and 148) could be omitted depending on the particular implementation of the system 100, and the multi-variable controller 146 could form part of an air supply house 102.

FIG. 2 illustrates an example multi-variable controller 146 for optimizing operation of an air supply house 102 according to this disclosure. The embodiment of the multi-variable controller 146 shown in FIG. 2 is for illustration only. Other embodiments of the multi-variable controller 146 could be used without departing from the scope of this disclosure. Also, for ease of explanation, the multi-variable controller 146 is described as being used in the system 100 of FIG. 1. The multi-variable controller 146 could be used in any other suitable system.

In this example embodiment, the multi-variable controller 146 includes a processor 202, a memory 204, a network interface 206, a display 208, and an input device 210. The processor 202 represents any suitable processing device, such as a microprocessor, digital signal processor, application-specific integrated circuit, or other logic device. The memory 204 represents any suitable volatile and/or non-volatile storage and retrieval device or devices, such as RAM or ROM. The network interface 206 represents any suitable interface for facilitating communication over a network, such as an Ethernet interface or other electrical signal line or wireless interface. The network interface 206 could, for example, receive measurement data identifying the current values of the controlled variables and output control signals for adjusting the manipulated variables. The display 208 represents any suitable display for presenting information to a user. The input device 210 represents any suitable device or devices for providing input to the processor 202 from the user, such as a keyboard or mouse.

In this example, the memory 204 includes one or more software applications 212*a*-212*b* and one or more models 214. The one or more software applications 212*a*-212*b* represent one or more computer programs defining how the multi-variable controller 146 controls one or more air supply houses 102 in the system 100. For example, the software application 212*a* could use the models 214 to analyze input data (such as measurements of different controlled variables) to generate output signals (such as control signals for adjusting manipulated variables).

As another example, as noted above, the humidifier 110 could include multiple units that can be individually activated and deactivated. Due to the nature of these multiple-unit humidifiers, it is often not possible to make continuous adjustments to the amount of humidity added to air by the humidifier 110. Rather, control of the humidifier 110 could be limited to adjusting the number of units in the humidifier 110 that are actively being used to add humidity to air. In some embodiments, an application 212*b* is used to collect desired changes to the operation of the humidifier 110 and to make incremental step changes to the humidifier 110 (by adjusting the number of humidifier units that are active). For instance, the application 212*b* could "save" the moves or changes to the humidifier's manipulated variable over a period of time. When the accumulated moves are adequate to require the activation of an additional humidifier unit or the deactivation of an active humidifier unit (such as when the accumulated moves exceed a threshold), the switch 122 can be adjusted to provide the desired number of active humidifier units. In this way, the application 212*b* supports step-size changes to the number of humidifier units, which could be done in a manner that is transparent to the control application 212*a*. It may be noted that the application 212*b* could be incorporated into the application 212*a*, or it could represent an application that is separate from the application 212*a*.

The one or more models 214 define relationships between the manipulated and disturbance variables and the controlled variables. The models 214 are used by the multi-variable controller 146 to control one or more air supply houses 102 in the system 100. Each air supply house 102 could have its own set of models, or multiple air supply houses 102 could have at least one common model. In particular embodiments, each model 214 could associate a single manipulated or disturbance variable to a single controlled variable.

As part of the control of the air supply houses 102, the multi-variable controller 146 could use the models 214 to make adjustments to manipulated variables so that controlled variables are maintained within specified limits. Also, the multi-variable controller 146 could do this while helping to ensure that certain process objectives are met. For example, the process objectives could include maintaining the temperature and humidity of the conditioned air provided to the paint booth 120 within acceptable ranges, while at the same time minimizing burner fuel and steam usage. The process objectives could also include controlling the air supply houses 102 so that the usage of more expensive materials (such as steam) is minimized, even if less expensive materials (such as natural gas) are minimized to a lesser extent. This may, for instance, allow the multi-variable controller 146 to provide more heating and/or humidifying of air using the burner 106 and the humidifier 110 than through the use of steam (via the steam sprayer 114 and heater 116).

As noted above, the proper selection of controlled, manipulated, and disturbance variables may be important or critical to the performance of the multi-variable controller 146. In particular embodiments, the multi-variable controller 146 may treat the variables identified in Table 1 as controlled variables, the variables identified in Table 2 as manipulated variables, and the variables identified in Table 3 as disturbance variables. The tables include, for each variable, an index number, a tag name, a description, and an engineering unit. Each tag name includes an indication of whether the variable is a process value (PV) (a current measurement in an air supply house) or an output value (OP) (a value provided to a valve or other controlled component).

TABLE 1

| CV# | Tag | Description | Units |
|---|---|---|---|
| 1 | CV01.PV | Average pre-heated air temperature (based on data from sensors 138) | °C. |
| 2 | CV02.PV | Humidity of conditioned air entering paint booth 120 (based on data from sensors 142-144) | % |
| 3 | CV03.PV | Temperature of conditioned air entering paint booth 120 (based on data from sensor 142) | °C. |

TABLE 2

| MV# | Tag | Description | Units |
|---|---|---|---|
| 1 | MV01.OP | Flow of fuel to burner 106 (controlled by opening of valve 123) | % |
| 2 | MV02.OP | Flow of steam to steam sprayer 114 (controlled by opening of valve 126) | % |
| 3 | MV03.OP | Flow of steam to heater 116 (controlled by opening of valve 128) | % |
| 4 | MV04.OP | Number of operating humidifier units (controlled by multi-position switch 122) | # |
| 5 | MV05.OP | Flow of chilled water to cooler 112 (controlled by opening of valve 124) | % |

TABLE 3

| DV# | Tag | Description | Units |
|---|---|---|---|
| 1 | DV01.PV | Inlet air temperature (based on data from sensor 132) | °C. |
| 2 | DV02.PV | Inter air dewpoint (based on data from sensor 134) | °C. |

In Table 1, CV01. PV represents the average temperature measurements from the sensor array 138. Average temperature measurements can be used to help compensate for stratification of the filtered air. Also, CV02. PV represents the humidity of the conditioned air entering the paint booth 120. The humidity can be calculated based on the temperature measurements from the sensor 142 and the dewpoint measurements from the sensor 144. In other embodiments, CV02. PV could represent by the dewpoint of the conditioned air entering the paint booth 120. In Table 2, MV04. OP represents the number of units in the humidifier 110 that are operational (being used to humidify air). As noted above, this variable could be controlled in a step-wise manner by the application 212b. Additional details of this type of control are provided in FIG. 5. It may be noted that other or additional variables could be used to control the operation of the air supply house(s) 102.

Using the controlled, manipulated, and disturbance variables defined above in Tables 1 through 3, models 214 can be constructed of an air supply house 102. These models 214 could be generated, for example, using step-test data involving the air supply house 102. Tables 4 through 7 below identify an example control "matrix" containing models 214 that associate controlled variables to manipulated or disturbance variables. No relationship (model defined as "Null") may exist between the controlled variables and the manipulated and disturbance variables. The models shown in Tables 4 through 7 are shown in Laplace Transform form. Note that these models are for illustration only and could vary depending on the air supply house being controlled.

TABLE 4

| CV: | MV: MV01 | MV02 |
|---|---|---|
| CV01 | $G(s) = 0.41 \dfrac{1}{1.3s+1} e^{-0s}$ | NULL |
| CV02 | $G(s) = -0.1 \dfrac{1}{6s+1} e^{-1.5s}$ | $G(s) = 0.38 \dfrac{1}{3s^2+4s+1} e^{-0s}$ |
| CV03 | $G(s) = 0.28 \dfrac{1}{7s+1} e^{-0s}$ | NULL |

TABLE 5

| CV: | MV: MV03 | MV04 |
|---|---|---|
| CV01 | NULL | NULL |
| CV02 | $G(s) = -1.7 \dfrac{1}{s^2+2.5s+1} e^{-0s}$ | $G(s) = 5 \dfrac{1}{6s+1} e^{-3s}$ |
| CV03 | $G(s) = 0.45 \dfrac{1}{0.4s^2+2.6s+1} e^{-0s}$ | $G(s) = -1.5 \dfrac{1}{22s+1} e^{-0s}$ |

TABLE 6

| CV: | MV: MV05 | DV01 |
|---|---|---|
| CV01 | NULL | $G(s) = 0.7 \dfrac{1}{1.2s+1} e^{-0s}$ |
| CV02 | $G(s) = -0.596 \dfrac{1}{5.4s^2+4.65s+1} e^{-0s}$ | $G(s) = -2.1 \dfrac{1}{12s+1} e^{-0s}$ |
| CV03 | $G(s) = 0.167 \dfrac{1}{5.6s^2+4.73s+1} e^{-0s}$ | $G(s) = 0.6 \dfrac{1}{2s^2+4s+1} e^{-0s}$ |

TABLE 7

| CV: | DV: DV02 |
|---|---|
| CV01 | NULL |
| CV02 | $G(s) = 2 \dfrac{1}{8s+1} e^{-0s}$ |
| CV03 | NULL |

Using these models 214, the multi-variable controller 146 can effectively control the controlled variables through adjustments to the manipulated variables. The multi-variable controller 146 can optimize the operation of an air supply house 102 using these models 214 and one or more economic optimization approaches. In some embodiments, the multi-variable controller 146 is configured to use either linear program (LP) economics or quadratic program (QP) economics when controlling an air supply house 102. These two economic optimization approaches use a simple minimization strategy, although the quadratic optimization also uses ideal resting values (or desired steady state values). The economics can be defined to meet various objectives. These objectives could include minimizing overall energy usage in an air supply house 102 while maintaining conditioned air within acceptable temperature and humidity ranges. The objectives could also include, when minimizing energy usage, minimizing steam usage by the steam sprayer 114 and heater 116 before attempting to minimize fuel usage by the burner 106.

In particular embodiments, the general form of an objective function could be:

$$\text{Minimize } J = \sum_i b_i \times CV_i + \sum_i a_i^2 (CV_i - CV_{0i})^2 + \sum_j b_j \times MV_j + \sum_j a_j^2 (MV_j - MV_{0j})^2,$$

where:
- $b_i$ represents the linear coefficient of the $i^{th}$ controlled variable;
- $b_j$ represents the linear coefficient of the $j^{th}$ manipulated variable;
- $a_i$ represents the quadratic coefficient of the $i^{th}$ controlled variable;
- $a_j$ represents the quadratic coefficient of the $j^{th}$ manipulated variable;
- $CV_i$ represents the actual resting value of the $i^{th}$ controlled variable;
- $CV_{0i}$ represents the desired resting value of the $i^{th}$ controlled variable;
- $MV_j$ represents the actual resting value of the $j^{th}$ manipulated variable; and
- $MV_{0j}$ represents the desired resting value of the $j^{th}$ manipulated variable.

In this objective function equation, weights could be added to the manipulated variables so that different manipulated variables are weighted more than others. For example, weights for MV02. OP and MV03. OP (relating to steam usage) could be larger than weights for MV01. OP (relating to burner fuel usage).

As shown here, the optimization may involve a large number of process variables, each able to be incorporated into either a linear or quadratic optimization objective. The multi-variable controller 146 can optimize the controlled variables using this optimization to meet various ones of the objectives described above.

In some embodiments, the models 214 could be generated for an air supply house 102 based on step testing of the various components in the air supply house 102. The construction of the models related to the CV02. PV controlled variable (the humidity of air entering the paint booth 120) may require modification or pre-processing of the measurement data from the sensors 142-144. As noted above, the humidity of air entering the paint booth 120 can be calculated based on the temperature measurements from the sensor 142 and the dew-point measurements from the sensor 144. However, in some situations, these variables are "out of phase" with one another. If the out-of-phase measurement data from the sensors 142-144 is used to build models for CV02. PV, the resulting models could give poor control over the humidity. To improve model identification, a lag can be added to one or more of the measurement data from the sensors 142-144, bringing the measurement data into phase and resulting in more accurate models. The amount of lag can be determined by examining the measurement data for a particular implementation of the air supply house 102.

As noted above, various PID or other legacy controllers 130 may be present in one or more air supply houses 102 being controlled by the multi-variable controller 146. Depending on the implementation, the multi-variable controller 146 could be configured to control the valves and other components of the air supply houses 102 via the legacy controllers 130. In other embodiments, the legacy controllers 130 could be deactivated or "broken," and the multi-variable controller 146 could be used directly or indirectly (via the local controllers 148) to adjust the valves and other components of the air supply houses 102.

Although FIG. 2 illustrates one example of a multi-variable controller 146 for optimizing operation of an air supply house 102, various changes may be made to FIG. 2. For example, the controller 146 could include any other or additional components according to particular needs. Also, while shown as being formed using a computer processing device, the controller 146 could be implemented in any other suitable manner. Further, the multi-variable controller 146 could be used to control one or multiple air supply houses 102. In addition, the details provided above (such as the identification of particular controlled, manipulated, and disturbance variables and models 214) are examples only. The multi-variable controller 146 could operate using any other suitable variables and/or models.

Figure 3A:
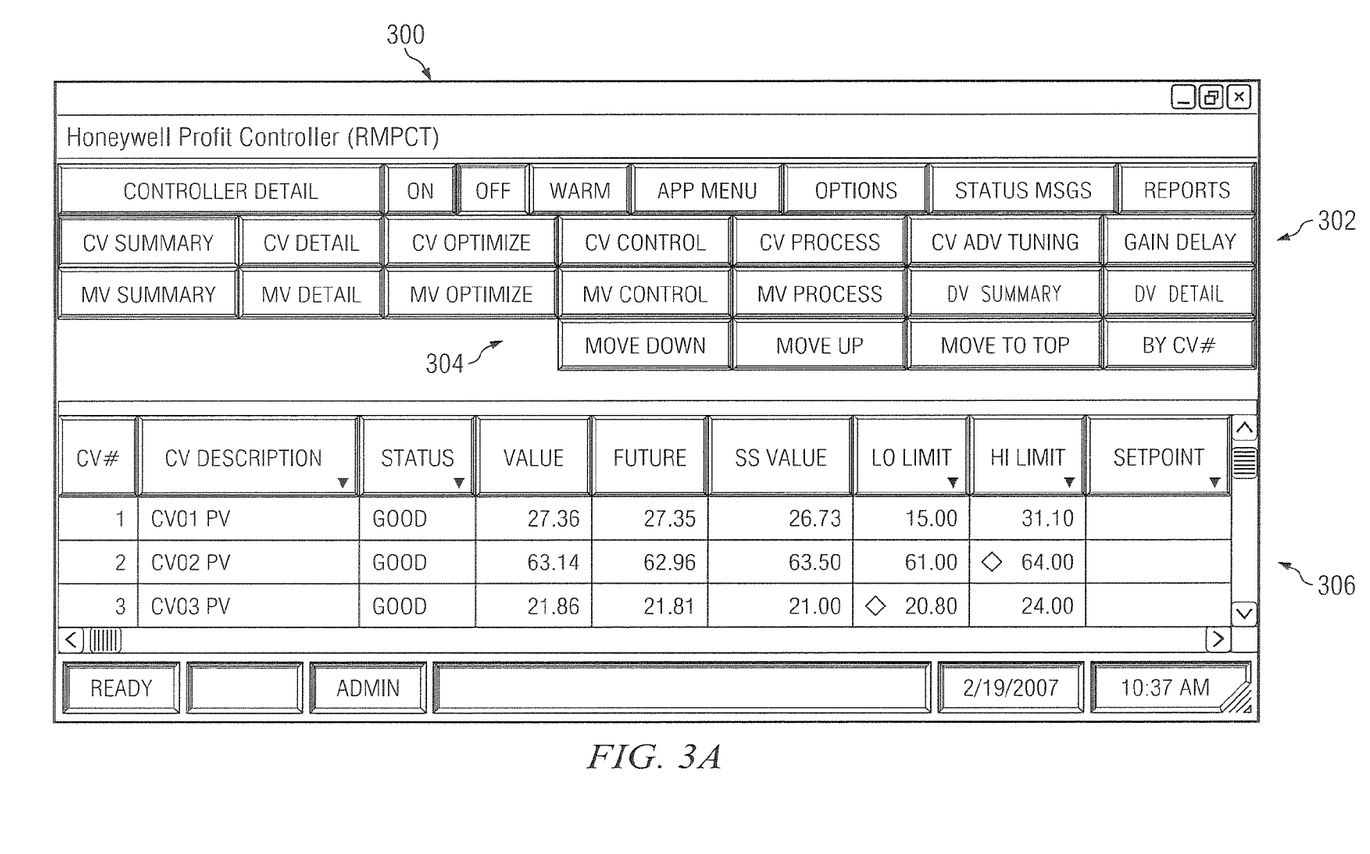
FIGS. 3A and 3B illustrate an example user interface for controlling operation of an air supply house according to this disclosure.
Figure 3B:
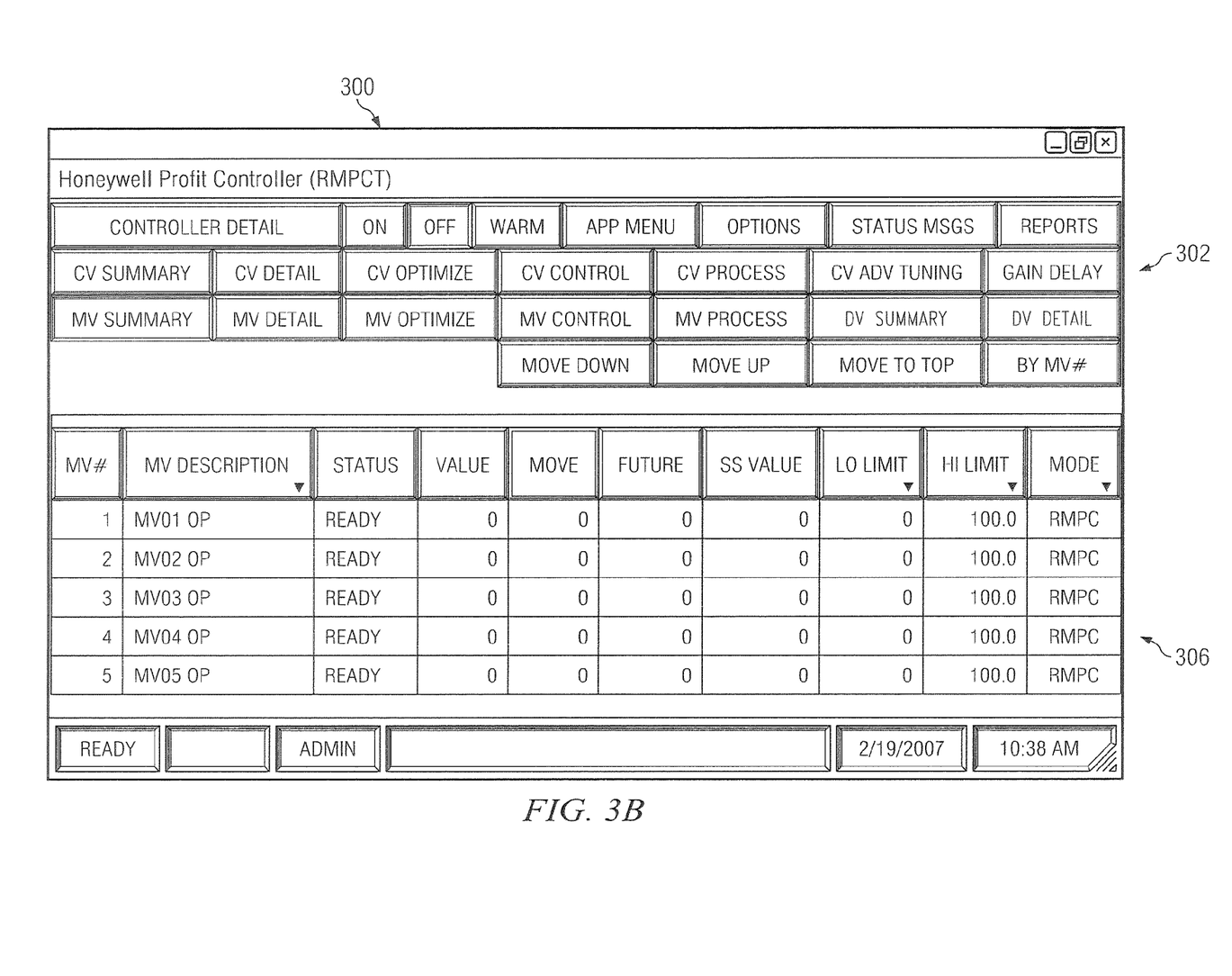

FIGS. 3A and 3B illustrate an example user interface 300 for controlling operation of an air supply house 102 according to this disclosure. The embodiment of the user interface 300 shown in FIGS. 3A and 3B is for illustration only. Other embodiments of the user interface 300 could be used without departing from the scope of this disclosure. Also, the user interface 300 may be provided by the multi-variable controller 146 or any other suitable device or system.

The user interface 300 may support various functions performed or implemented by the multi-variable controller 146. For example, the user interface 300 may allow a user to adjust parameters of different controlled variables, thereby allowing the user to adjust how the multi-variable controller 146 is controlling one or more air supply houses 102.

In this example, the user interface 300 includes control buttons 302, which allow the user to invoke various high-level functions related to the multi-variable controller 146. In this example, the control buttons 302 allow the user to place the multi-variable controller 146 in an on, off, or warm (predicting but not controlling) state. The control buttons 302 also allow the user to view an application menu, set various high-level options, and view status messages or reports.

When the multi-variable controller 146 is activated using the appropriate control button 302, function buttons 304 can be used to invoke particular functions by the user or to display particular information to the user. The information could, for example, be displayed in a display area 306 of the user interface 300.

As shown in FIG. 3A, selection of the "CV Summary" button 304 allows the user to view and configure information associated with the controlled variables. For each controlled variable, the display area 306 includes a numerical index and a description. The display area 306 also includes the status of the controlled variable, indicating whether the controlled variable is being controlled ("good") or not ("drop"). The display area 306 further identifies a current value, a dynamic predicted future value, and a predicted steady-state (SS) value of the controlled variable. In addition, the display area 306 identifies low and high limits and a setpoint for the controlled variable. Using the user interface 300, the user could alter the low limit, high limit, or setpoint for one or more of the controlled variables. The multi-variable controller 146 could then take this information into account when controlling the air supply houses 102.

As shown in FIG. 3B, selection of the "MV Summary" button 304 allows the user to view and configure information associated with the manipulated variables. For each manipulated variable, the display area 306 includes a numerical index and a description. The display area 306 also includes the status of the manipulated variable, indicating whether the manipulated variable is being manipulated ("on"), ready to be manipulated ("ready"), used in a feed-forward manner ("FFWD"), or not used ("serv"). The display area 306 further identifies a current value, a dynamic predicted future value, and a predicted steady-state (SS) value of the manipulated variable. Beyond that, the display area 306 identifies a calculated move or change in the setpoint of the manipulated variable. In addition, the display area 306 identifies low and high limits, a setpoint, and a mode of operation for the manipulated variable. The mode indicates whether the manipulated variable is being controlled manually ("OPR") or by the controller 146 ("RMPC"). Using the user interface 300, the user could alter the low limit, high limit, setpoint, or mode for one or more of the manipulated variables. The multi-variable controller 146 could then take this information into account when controlling the air supply houses 102.

Although FIGS. 3A and 3B illustrate one example of a user interface 300 for controlling an air supply house 102, various changes could be made to FIGS. 3A and 3B. For example, any other or additional user interface could be used. Also, the arrangement and content of the user interface 300 shown in FIGS. 3A and 3B is for illustration only.

Figure 4A:
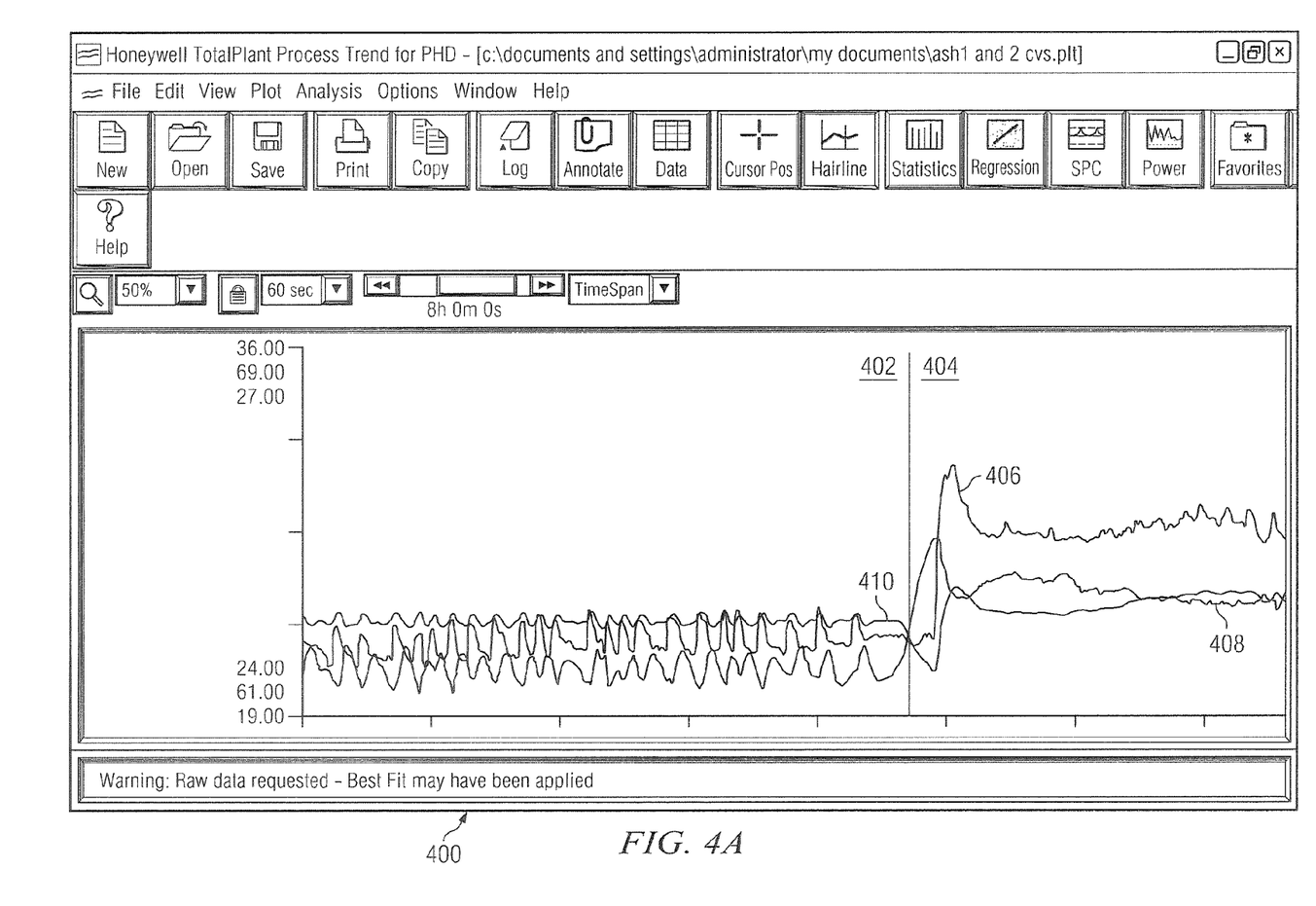
FIGS. 4A and 4B illustrate example benefits obtained using a multi-variable controller for optimizing operation of an air supply house according to this disclosure.
Figure 4B:
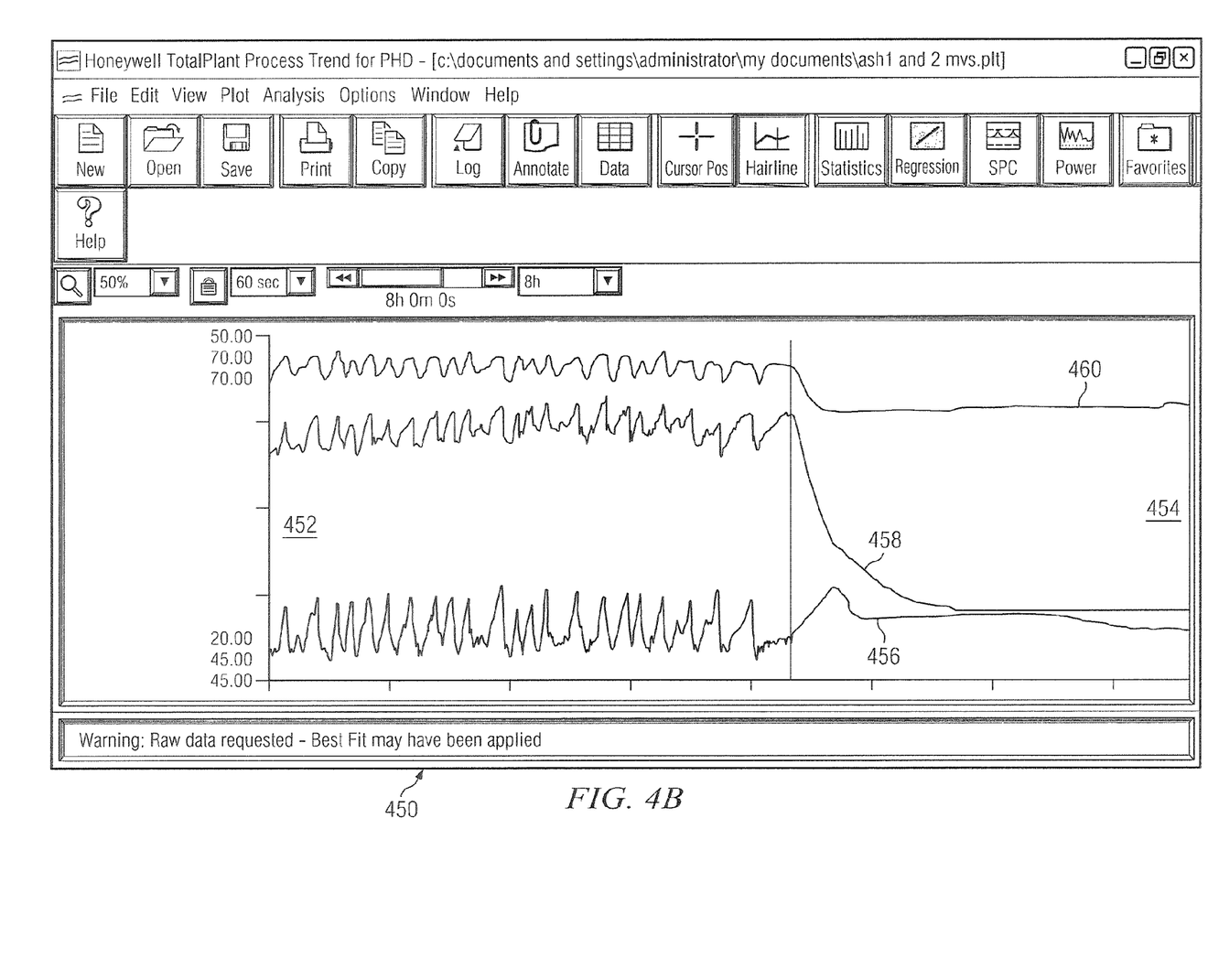

FIGS. 4A and 4B illustrate example benefits obtained using a multi-variable controller for optimizing operation of an air supply house according to this disclosure. The examples shown in FIGS. 4A and 4B are for illustration only. The multi-variable controller 146 could operate in any other suitable manner, which may or may not result in similar operations as those shown in FIGS. 4A and 4B.

In FIG. 4A, a graph 400 illustrates the control of the controlled variables CV01. PV, CV02. PV, and CV03. PV by the multi-variable controller 146. In this example, the graph 400 is divided into two sections 402-404. The first section 402 represents normal control of an air supply house 102 (without the multi-variable controller 146), and the second section 404 represents advanced control of the air supply house 102 (with the multi-variable controller 146). Lines 406-410 represent the values of the controlled variables CV01. PV, CV02. PV, and CV03. PV, respectively.

As can be seen here, the controlled variables undergo more significant oscillations in the first section 402 and less significant oscillations in the second section 404. This indicates that the multi-variable controller 146 controls these controlled variables with less variability.

In FIG. 4B, a graph 450 illustrates valve movements for the valves 123, 126, and 128. As noted above, the valve 123 controls the flow of fuel to the burner 106, while the valves 126 and 128 control the flow of steam to the steam sprayer 114 and the heater 116, respectively. The graph 450 is again divided into two sections 452-454. The first section 452 represents normal control of the air supply house 102 without the multi-variable controller 146, and the second section 454 represents advanced control of the air supply house 102 using the multi-variable controller 146. Lines 456-460 represent the values of the manipulated variables MV01. OP, MV02. OP, and MV03. OP, respectively.

Once again, as can be seen here, the manipulated variables undergo more significant oscillations in the first section 452 and less significant oscillations in the second section 454. This means that the valves 123, 126, and 128 experience fewer moves after the multi-variable controller 146 begins controlling the air supply house 102. This could result in less "wear and tear" on the valves 123, 126, and 128. Also, the line 456 represents the opening of the valve 123 and indicates that the amount of fuel used by the burner 106 has, in general, settled on a slightly higher setting in the second section 454. However, the lines 458-460 represent the openings of the valves 126-128 and indicate that the amount of steam used by the air supply house 102 has decreased (to a very large extent with respect to the valve 126). Since fuel used by the burner 106 is typically less expensive than the cost of producing steam, the multi-variable controller 146 can provide a significant reduction in steam usage, resulting in significant cost savings.

Although FIGS. 4A and 4B illustrate examples of benefits obtained using a multi-variable controller 146 for optimizing operation of an air supply house 102, various changes could be made to FIGS. 4A and 4B. For example, the controlled and manipulated variables for an air supply house 102 could vary and be controlled in any other suitable manner.

Figure 5:
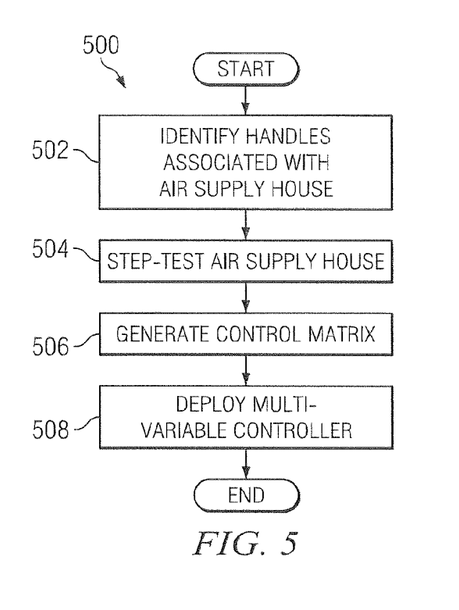
FIG. 5 illustrates an example method for deploying a multi-variable controller for optimizing operation of an air supply house according to this disclosure.

FIG. 5 illustrates an example method 500 for deploying a multi-variable controller for optimizing operation of an air supply house according to this disclosure. The embodiment of the method 500 shown in FIG. 5 is for illustration only. Other embodiments of the method 500 could be used without departing from the scope of this disclosure. Also, for ease of explanation, the method 500 is described with respect to the multi-variable controller 146 in the system 100 of FIG. 1. The method 500 could be used by any device or system.

Handles associated with an air supply house are identified at step 502. The handles typically represent any suitable components of the air supply house that can be controlled with a controller. In FIG. 1, the handles of the air supply house 102 could include the openings of the valves 123, 124, 126, and 128. The handles could also include the setting of the multi-position switch 122. These handles could be used by a controller to adjust the operation of the air supply house 102.

The air supply house is step-tested at step 504. Step testing typically includes making step-wise changes to the identified handles. As particular examples, step testing could include making known changes to the openings for each of the valves 123, 124, 126, and 128 and by changing the number of active humidifier units through the switch 122. The step testing may also include collecting data from various sensors, such as the sensors 132-144, as the changes are made the valves 123, 124, 126, and 128 and switch 122.

A control matrix is generated at step 506. This could include, for example, generating models in a matrix similar to that shown in Tables 4 through 7. The matrix could have any identified controlled variables on one axis and any identified manipulated and disturbance variables on another axis. The manipulated variables may include or be associated with the handles identified previously. Step 506 could also include analyzing the data collected during the step testing and using the data to generate models in the matrix. Various model identification techniques are known and can be used here. In addition, as described above, step 506 could include modifying measurement data from the sensors 142-144 to correct for any phase difference between the data.

A multi-variable controller is then deployed at step 508. This could include, for example, providing the multi-variable controller 146 in the system 100. The models identified during the prior step could be stored in or otherwise made accessible to the multi-variable controller 146, and the multi-variable controller 146 can operate to control the air supply house.

Although FIG. 5 illustrates one example of a method 500 for deploying a multi-variable controller for optimizing operation of an air supply house, various changes may be made to FIG. 5. For example, while shown as a series of steps, various steps in FIG. 5 could overlap, occur in parallel, or occur multiple times. As a particular example, steps 502-506 could be repeated at times to ensure accurate models are being used or to generate more accurate models of the air supply house being controlled.

Figure 6:
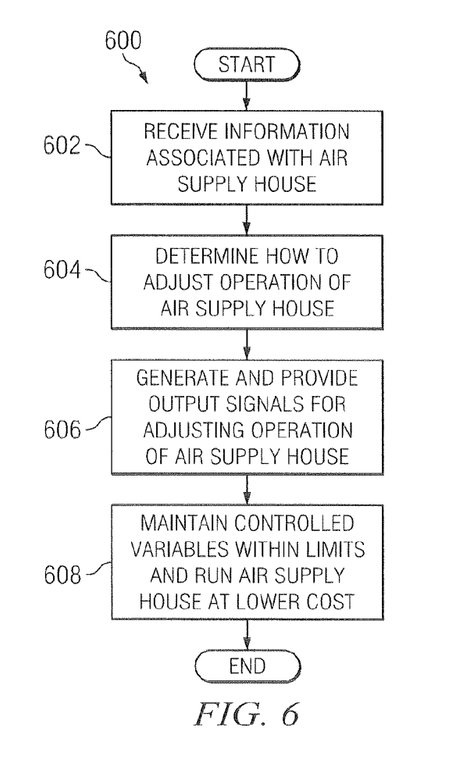
FIG. 6 illustrates an example method for optimizing operation of an air supply house according to this disclosure.

FIG. 6 illustrates an example method 600 for optimizing operation of an air supply house according to this disclosure. The embodiment of the method 600 shown in FIG. 6 is for illustration only. Other embodiments of the method 600 could be used without departing from the scope of this disclosure. Also, for ease of explanation, the method 600 is described with respect to the multi-variable controller 146 controlling one or more air supply houses 102 in the system 100 of FIG. 1. The method 600 could be used by any device or system and with any number and type of air supply house(s).

Information associated with the operation of one or more air supply houses is received at step 602. This could include, for example, the multi-variable controller 146 receiving data identifying how certain controlled, manipulated, and disturbance variables are behaving during operation of the air supply houses 102 in the system 100. The data could be stored in a database or other repository.

The controller determines how to adjust the operation of the air supply houses at step 604. This may include, for example, the multi-variable controller 146 predicting the future values of one or more controlled variables, such as by analyzing past and current data regarding the controlled variables to estimate the future values of the controlled variables. This may also include the multi-variable controller 146 using the models 214 to determine how to adjust one or more manipulated variables to control the controlled variables. This may further include the multi-variable controller 146 considering the values of one or more disturbance variables. During this step, the multi-variable controller 146 can give more weight to the use of steam or other more expensive materials in a minimization objective function. As a result, during the minimization, the multi-variable controller 146 could attempt to minimize use of the steam or other more expensive materials to a greater extent than natural gas or other less expensive materials.

The controller generates one or more output signals that are provided to the air supply houses at step 606. This may include, for example, the multi-variable controller 146 outputting control signals to adjust valves and other components in the air supply houses 102. This can be done to alter valve or switch positions to control temperatures, humidities, flow rates, or other manipulated variables in the air supply houses 102. These changes may have corresponding effects on the controlled variables being monitored in the air supply houses 102.

In this way, the controller is able to maintain the controlled variables within their specified limits while also running the air supply houses at lower cost at step 608. This may include, for example, the multi-variable controller 146 adjusting the manipulated variables so that the controlled variables stay within their limits. This may also include the multi-variable controller 146 determining how to adjust the manipulated variables to minimize the amount of steam used by the air supply houses 102, such as by using LP or QP economics.

Although FIG. 6 illustrates one example of a method 600 for optimizing operation of an air supply house, various changes may be made to FIG. 6. For example, while shown as a series of steps, various steps in FIG. 6 could overlap, occur in parallel, or occur multiple times. As a particular example, various steps in FIG. 6 could be repeated, such as when the multi-variable controller 146 performs steps 602-606 at a 30-second or other specified interval.

Figure 7:
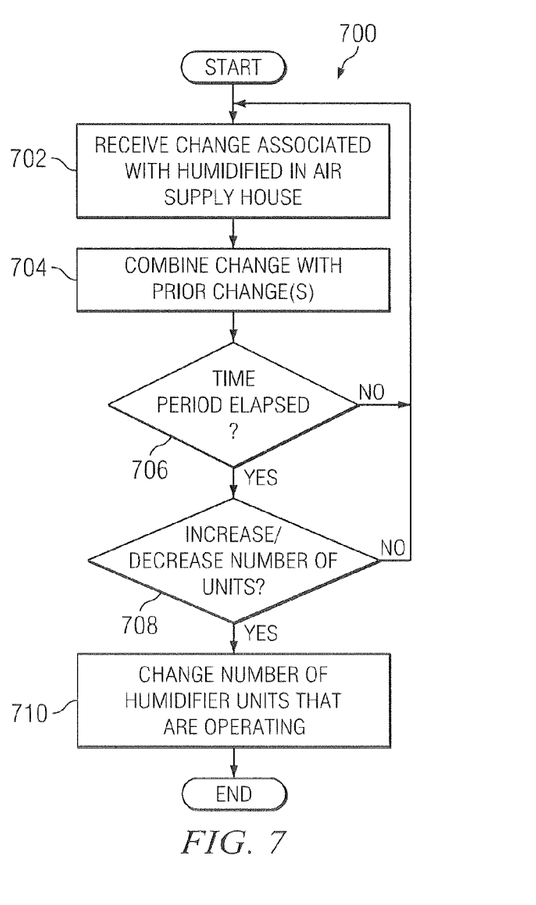
FIG. 7 illustrates an example method for controlling a number of humidifier units used in an air supply house according to this disclosure.

FIG. 7 illustrates an example method 700 for controlling a number of humidifier units used in an air supply house according to this disclosure. The embodiment of the method 700 shown in FIG. 7 is for illustration only. Other embodiments of the method 700 could be used without departing from the scope of this disclosure. Also, for ease of explanation, the method 700 is described with respect to the multi-variable controller 146 controlling the number of active units of the humidifier 110 in the system 100 of FIG. 1. The method 700 could be used by any device or system and with any number and type of humidifiers and humidifier units.

A change associated with a humidifier in an air supply house is received at step 702. This could include, for example, the application 212b receiving a change in the output value (OP) associated with the humidifier 110 from the application 212a. From the perspective of the application 212a, the humidifier 110 may represent a device that can be controlled by continuous adjustments to the humidifier's OP value. As a result, the application 212a can make continuous adjustments to the humidifier's OP value during control operations.

The received change is combined with any prior changes at step 704. This could include, for example, the application 212b adding the received adjustment to the humidifier's OP value to any prior adjustments received from the application 212a. In this way, the application 212b can "accumulate" the changes to the humidifier's OP value that are generated by the application 212a. This can continue until a specified period of time has elapsed at step 706, such as one or more hours.

If the accumulated changes (after the period of time has elapsed) do not require a change in the number of humidifier units at step 708, the method 700 returns to step 702. Otherwise, the number of units is adjusted at step 710. This may include, for example, the application 212b causing the multi-position switch 122 to either increase or decrease the number of humidifier units that are operational. Whether the number is increased or decreased depends on whether the accumulated changes to the humidifier's OP value indicate more or less humidity is needed.

Although FIG. 7 illustrates one example of a method 700 for controlling a number of humidifier units used in an air supply house, various changes may be made to FIG. 7. For example, humidifiers that allow continuous control could be used in the air supply house 102, and the method 700 may not be required.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
   at least one memory configured to store at least one model, the at least one model associated with manipulated variables and the one or more controlled variables, the manipulated and controlled variables associated with a supply of conditioned air for drying one or more objects; and
   at least one processor configured to determine how to adjust the manipulated variables using the at least one model;
   wherein the one or more controlled variables include at least one of: a temperature, a dewpoint, and a humidity of the conditioned air; and
   wherein the manipulated variables include (i) a flow of heated material used to condition the conditioned air and (ii) a flow of fuel to a burner used to pre-heat air that is conditioned to produce the conditioned air.

2. The apparatus of claim 1, wherein the one or more controlled variables include:
   an average temperature of the pre-heated air that is conditioned to produce the conditioned air;
   the humidity of the conditioned air; and
   the temperature of the conditioned air.

3. The apparatus of claim 1, wherein the manipulated variables include:
   a flow of steam to a steam sprayer;
   a flow of steam to a heater; and
   a flow of chilled water to a cooler.

4. The apparatus of claim 1, wherein the manipulated variables include a number of active units in a humidifier.

5. The apparatus of claim 4, wherein the at least one processor is further configured to accumulate adjustments associated with the humidifier and to alter the number of active units in the humidifier when the accumulated adjustments exceed a threshold.

6. The apparatus of claim 1, wherein the at least one model is further associated with one or more disturbance variables, the one or more disturbance variables including at least one of: a temperature and a dewpoint associated with the air that is conditioned to produce the conditioned air.

7. The apparatus of claim 1, wherein:
   generation of the conditioned air includes use of steam; and
   the at least one processor is configured to determine how to adjust one or more of the manipulated variables so that the use of steam is minimized.

8. The apparatus of claim 7, wherein the at least one processor is configured so that minimizing the use of steam has a higher priority than minimizing the use of the fuel.

9. The apparatus of claim 1, wherein the at least one processor is configured to determine how to adjust the manipulated variables using one of: a linear program economic optimization and a quadratic program economic optimization.

10. The apparatus of claim 1, wherein the at least one processor is further configured to provide one or more control signals to an air supply house, the air supply house configured to generate the supply of conditioned air, the one or more control signals based on the determined adjustments to the manipulated variables.

11. A method comprising:
    determining, at a multi-variable controller, how to adjust manipulated variables using at least one model, the manipulated variables associated with a supply of conditioned air for drying one or more objects; and
    generating one or more control signals to control one or more controlled variables associated with the supply of conditioned air;
    wherein the one or more controlled variables include at least one of: a temperature, a dewpoint, and a humidity of the conditioned air; and
    wherein the manipulated variables include (i) a flow of heated material used to condition the conditioned air and (ii) a flow of fuel to a burner used to pre-heat air that is conditioned to produce the conditioned air.

12. The method of claim 11, wherein the one or more controlled variables include:
    an average temperature of the pre-heated air that is conditioned to produce the conditioned air;
    the humidity of the conditioned air; and
    the temperature of the conditioned air.

13. The method of claim 11, wherein the manipulated variables include:
    a flow of steam to a steam sprayer;
    a flow of steam to a heater; and
    a flow of chilled water to a cooler.

14. The method of claim 11, wherein the manipulated variables include a number of active units in a humidifier; and
    generating the one or more control signals comprises accumulating adjustments associated with the humidifier and generating a control signal to alter the number of active units in the humidifier when the accumulated adjustments exceed a threshold.

15. The method of claim 11, wherein the at least one model is further associated with one or more disturbance variables, the one or more disturbance variables including at least one of: a temperature and a dewpoint associated with the air that is conditioned to produce the conditioned air.

16. The method of claim 11, wherein:
generation of the conditioned air includes the use of the fuel for the burner and use of steam; and
minimizing the use of the steam has a higher priority than minimizing the use of the fuel during the generation of the one or more control signals.

17. The method of claim 11, wherein generating the one or more control signals comprises determining how to adjust the manipulated variables using one of: a linear program economic optimization and a quadratic program economic optimization.

18. The method of claim 11, further comprising providing the one or more control signals to an air supply house, the air supply house generating the supply of conditioned air.

19. A computer readable medium embodying a computer program, the computer program comprising:
computer readable program code for determining how to adjust manipulated variables using at least one model, the manipulated variables associated with a supply of conditioned air for drying one or more objects; and
computer readable program code for generating one or more control signals to control one or more controlled variables associated with the supply of conditioned air;
wherein the one or more controlled variables include at least one of: a temperature, a dewpoint, and a humidity of the conditioned air; and
wherein the manipulated variables include (i) a flow of heated material used to condition the conditioned air and (ii) a flow of fuel to a burner used to pre-heat air that is conditioned to produce the conditioned air.

20. The computer readable medium of claim 19, wherein the manipulated variables include a number of active units in a humidifier; and
further comprising computer readable program code for accumulating adjustments associated with the humidifier and for generating a control signal to alter the number of active units in the humidifier when the accumulated adjustments exceed a threshold.

\* \* \* \* \*